United States Patent
Fukushima et al.

(10) Patent No.: US 12,136,506 B2
(45) Date of Patent: Nov. 5, 2024

(54) ELECTRICAL WIRE ARRANGEMENT STRUCTURE

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Daichi Fukushima, Mie (JP); Housei Mizuno, Mie (JP); Tetsuya Kuwabara, Osaka (JP); Toru Tanji, Osaka (JP)

(73) Assignees: AUTONETWORKS TECHNOLOGIES, LTD., Mie (JP); SUMITOMO WIRING SYSTEMS, LTD, Mie (JP); SUMITOMO ELECTRIC INDUSTRIES, LTD, Osaka (JP)

( * ) Notice: Subject to any disclaimer, the term of this patent is extended or adjusted under 35 U.S.C. 154(b) by 177 days.

(21) Appl. No.: 17/769,136

(22) PCT Filed: Aug. 28, 2020

(86) PCT No.: PCT/JP2020/032571
§ 371 (c)(1),
(2) Date: Apr. 14, 2022

(87) PCT Pub. No.: WO2021/084883
PCT Pub. Date: May 6, 2021

(65) Prior Publication Data
US 2023/0028477 A1    Jan. 26, 2023

(30) Foreign Application Priority Data
Oct. 31, 2019 (JP) .................... 2019-198455

(51) Int. Cl.
*H01B 7/42* (2006.01)
*H01B 7/08* (2006.01)
(Continued)

(52) U.S. Cl.
CPC ............. *H01B 7/42* (2013.01); *H01B 7/0846* (2013.01)

(58) Field of Classification Search
CPC .......... H01B 7/42; H01B 7/0846; H01B 7/08; H02G 3/03; H02G 3/0456
See application file for complete search history.

(56) References Cited

U.S. PATENT DOCUMENTS 3,819,848 A * 6/1974 Fry ...................... H02G 3/0487
174/72 A
5,422,439 A   6/1995 Grove et al.
(Continued)

FOREIGN PATENT DOCUMENTS

CN    2819401      9/2006
CN    107705961    2/2018
(Continued)

OTHER PUBLICATIONS

China Office Action issued in CN Application No. 202080074628.X, dated Sep. 11, 2023.
(Continued)

*Primary Examiner* — Timothy J Thompson
*Assistant Examiner* — Amol H Patel
(74) *Attorney, Agent, or Firm* — GREENBLUM & BERNSTEIN, P.L.C.

(57) ABSTRACT

An electrical wire arrangement structure includes: a base member; and an electrical wire group including four or more electrical wires, wherein the electrical wire group includes a parallel arrangement part fixed in a parallel state by the base member, and in the parallel arrangement part, an average value of sizes between the electrical wires in a central part region in a width direction is larger than an average value of sizes between the electrical wires in both side part regions in a width direction.

4 Claims, 7 Drawing Sheets

(51) Int. Cl.
*H02G 3/03* (2006.01)
*H02G 3/04* (2006.01)

(56) References Cited

U.S. PATENT DOCUMENTS

| | | | |
|---|---|---|---|
| 2011/0174515 A1* | 7/2011 | Siahaan | H01B 7/0823 |
| | | | 174/102 R |
| 2014/0182890 A1* | 7/2014 | Gross | H01B 7/00 |
| | | | 174/251 |
| 2019/0392963 A1 | 12/2019 | Ishida et al. | |
| 2022/0059253 A1 | 2/2022 | Ebata et al. | |

FOREIGN PATENT DOCUMENTS

| | | |
|---|---|---|
| CN | 110313039 | 10/2019 |
| JP | S63-008527 A | 1/1988 |
| JP | H09-035540 A | 2/1997 |
| JP | H10-012047 A | 1/1998 |
| JP | 2000-050464 A | 2/2000 |
| JP | 2010-135203 | 6/2010 |
| JP | 2018-137208 A | 8/2018 |
| JP | 2019-185949 A | 10/2019 |
| JP | 6590134 | 10/2019 |

OTHER PUBLICATIONS

International Search Report issued in International Pat. Appl. No. PCT/JP2020/032571, dated Nov. 17, 2020, English translation.

International Preliminary Report on Patentability issued in International Pat. Appl. No. PCT/JP2020/032571, dated Aug. 26, 2021, English translation.

Office Action, Japan Patent Office, in counterpart Japanese Patent Application No. 2019-198455, issued on Feb. 28, 2023 (with English translation).

* cited by examiner

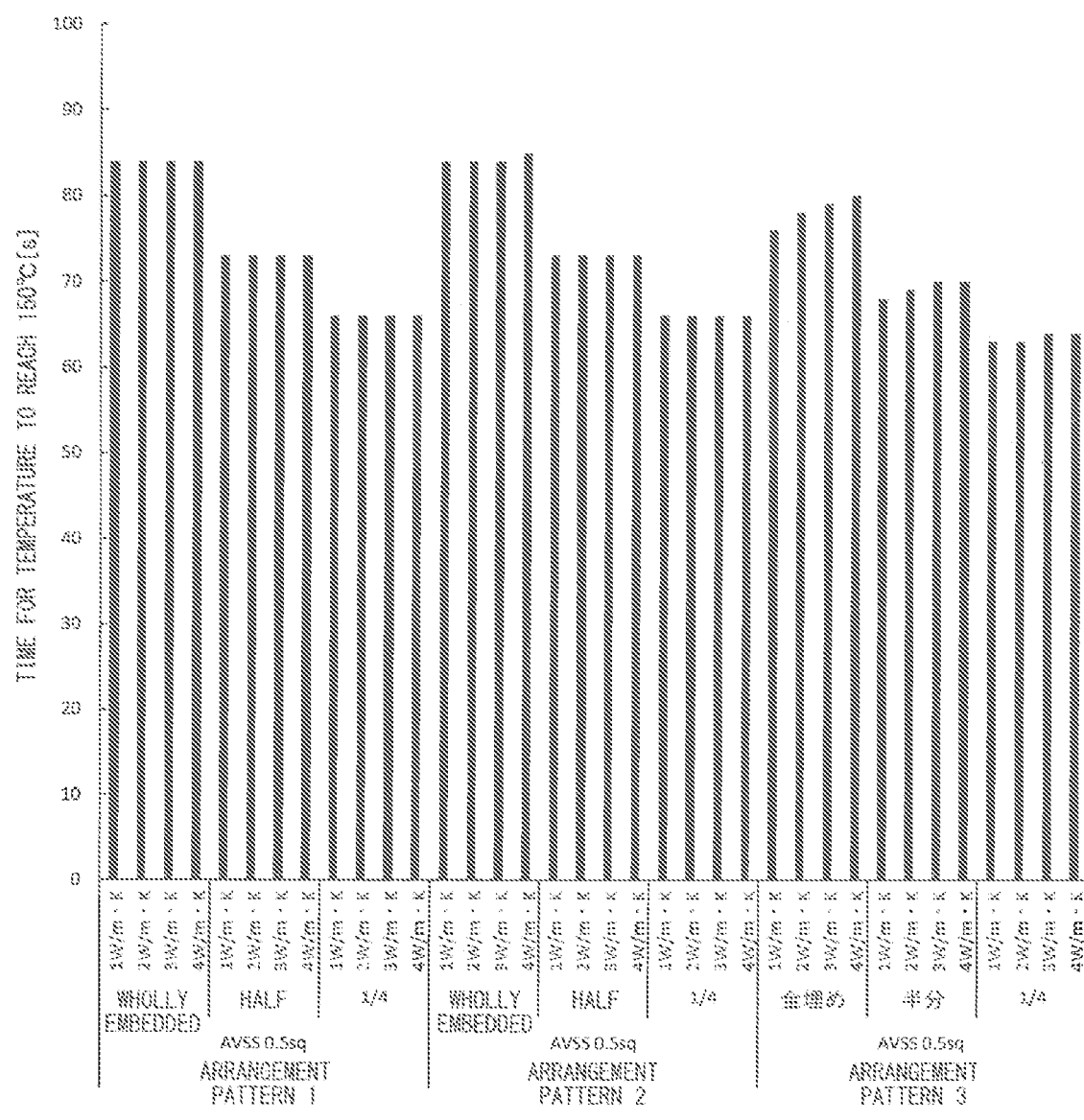

ELECTRICAL WIRE ARRANGEMENT STRUCTURE

TECHNICAL FIELD

The present disclosure relates to an electrical wire arrangement structure.

BACKGROUND ART

Patent Document 1 discloses a wire harness in which at least a part of a portion where an insulating covering of an electrical wire and a functional exterior member formed into a sheet-like shape overlap with each other is welded.

Patent Document 2 discloses that an exposed part where a tape is not wound is provided in an electrical wire group near a connection end connected to an electrical connection box. It also discloses that the exposed part is formed in a heat radiation part expanding in a radial direction to have a gap between the electrical wires.

PRIOR ART DOCUMENTS

Patent Documents

Patent Document 1: Japanese Patent Application Laid-Open No. 2018-137208
Patent Document 2: Japanese Patent Application Laid-Open No. 2000-50464

SUMMARY

Problem to be Solved by the Invention

Further improvement of heat radiation properties is desired in a wire harness. A configuration as compact as possible is required also in providing the heat radiation part.

Thus, an object of the present disclosure is to improve the heat radiation properties by a configuration as compact as possible.

Means to Solve the Problem

An electrical wire arrangement structure according to the present disclosure is an electrical wire arrangement structure including: a base member; and an electrical wire group including four or more electrical wires, wherein the electrical wire group includes a parallel arrangement part fixed in a parallel state by the base member, and in the parallel arrangement part, an average value of sizes between the electrical wires in a central part region in a width direction is larger than an average value of sizes between the electrical wires in both side part regions in a width direction.

Effects of the Invention

According to the present disclosure, heat radiation properties are improved by a configuration as compact as possible.

BRIEF DESCRIPTION OF DRAWINGS

FIG. 7 is a drawing illustrating an analysis result of a time for a temperature of the electrical wire to reach 150° C. for arrangement patterns 1, 2, and 3.

DESCRIPTION OF EMBODIMENT(S)

Description of Embodiment of Present Disclosure

Figure 1:
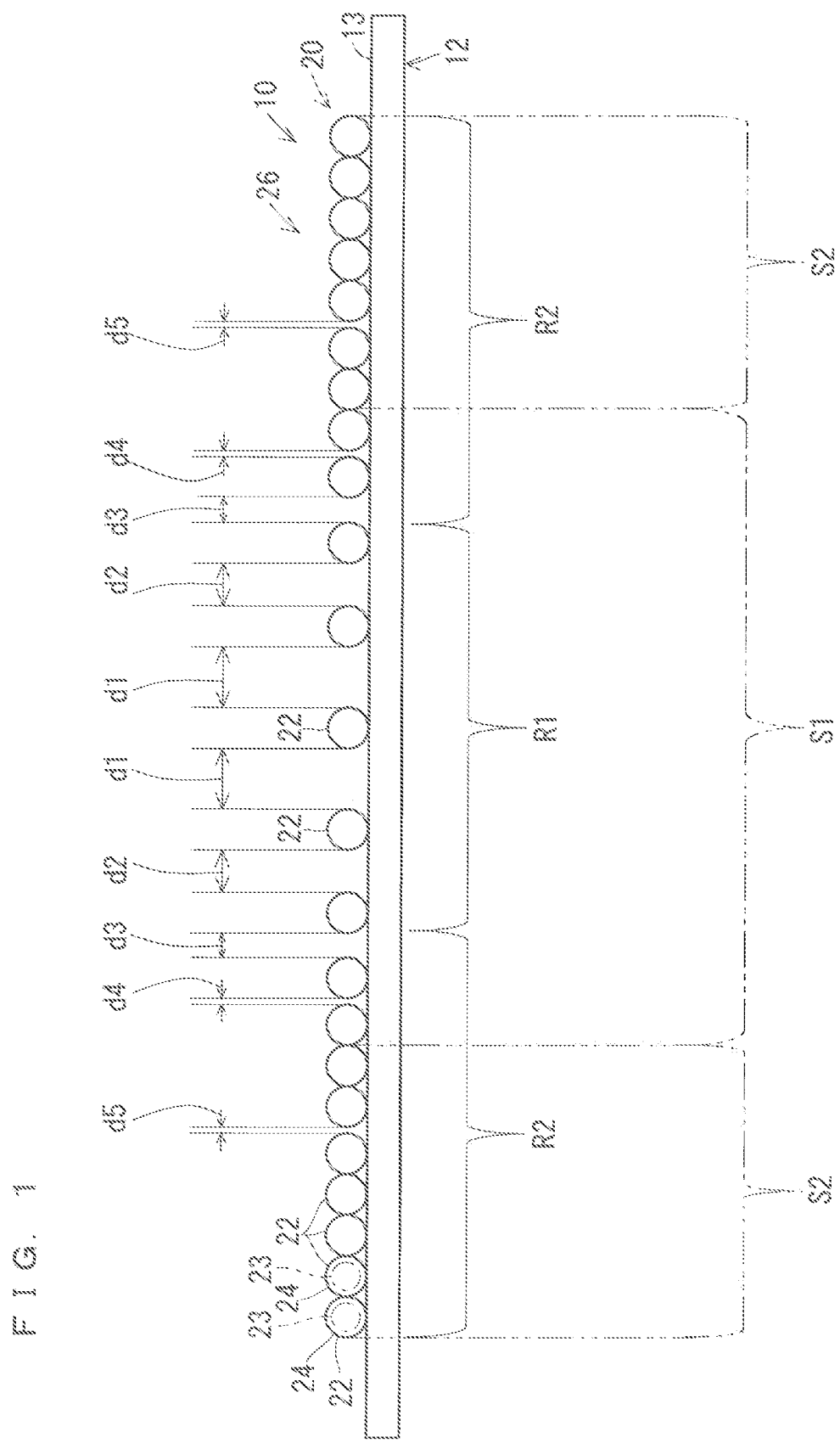
FIG. 1 is a drawing illustrating an electrical wire arrangement structure according to an embodiment.

Embodiments of the present disclosure are listed and described firstly.

An electrical wire arrangement structure according to the present disclosure is as follows.

(1) An electrical wire arrangement structure includes: a base member; and an electrical wire group including four or more electrical wires, wherein the electrical wire group includes a parallel arrangement part fixed in a parallel state by the base member, and in the parallel arrangement part, an average value of sizes between the electrical wires in a central part region in a width direction is larger than an average value of sizes between the electrical wires in both side part regions in a width direction.

According to the present disclosure, in the parallel arrangement part, the average value of the sizes between the electrical wires in the central part region is larger than the average value of the sizes between the electrical wires in the both side part regions. Thus, the average value of the sizes between the electrical wires is large in the central part region where heat is easily accumulated, thus heat is efficiently radiated. The average value of the sizes between the electrical wires is small in the both side part regions located in a position where heat is easily radiated compared with the central part region, thus an arrangement space of the electrical wire has a width as narrow as possible. Accordingly, heat radiation properties are improved by a configuration as compact as possible.

(2) When the parallel arrangement part is equally divided into three by a length in a parallel direction, it is applicable that both outer side regions in the parallel arrangement part are the both side part regions and a central region is the central part region. When the parallel arrangement part is equally divided into three by the length in the parallel direction, heat is efficiently radiated in the central part region, and the electrical wires are arranged as close as possible in the both side part regions.

(3) It is applicable that the both side part regions are regions where the electrical wires being one-third or less of a total number of the electrical wires in the parallel arrangement part are arranged when the total number is counted from both sides of the parallel arrangement part, and the central part region is a region where remaining electrical wires are arranged. Heat is efficiently radiated in the central part region based on the number of the electrical wires in the parallel arrangement part, and the both side part regions are as narrow as possible.

(4) It is applicable that end portions of the electrical wire group are connected to a connected in a parallel state, and a width of the parallel arrangement part is larger than a width of the electrical wire group extending out of the connector. The width of the parallel arrangement part is larger than the width of the electrical wire group extending out of the connector, thus heat radiation properties are increased.

(5) It is applicable that three or more gaps for heat radiation are formed between the four or more electrical wires in the parallel arrangement part, and a size of the three or more gaps for heat radiation is reduced from a center toward an outer side in a width direction. In this case, the electrical wires are coarsely arranged with a decreasing distance from the center where heat is easily accumulated, thus heat is efficiently radiated. The electrical wires are closely arranged with a decreasing distance from a side edge part where heat is easily radiated, and an arrangement space is reduced.

Details of Embodiment of Present Disclosure

Specific examples of an electrical wire arrangement structure of the present disclosure are described hereinafter with reference to the drawings. The present disclosure is not limited to these examples, but is indicated by claims, and it is intended that meanings equivalent to claims and all modifications within a scope of claims are included.

Embodiment

An electrical wire arrangement structure according to an embodiment is described hereinafter. FIG. 1 is a drawing illustrating an electrical wire arrangement structure 10 according to the embodiment. FIG. 1 illustrates a positional relationship between a base member 12 and an electrical wire 22 in a plane perpendicular to the electrical wire 22.

The electrical wire arrangement structure 10 includes the base member 12 and an electrical wire group 20.

The base member 12 includes a fixation surface 13 to which the electrical wire group 20 is attached. The fixation surface 13 may be a planar surface, a curved surface, or a surface in which a planar surface and a curved surface are combined.

The base member 12 may be metal or resin. When the base member 12 is metal, heat generated in the electrical wire group 20 is transmitted to the whole base member 12, and heat is efficiently radiated in the base member 12.

The base member 12 may be a sheet-like member flexibly bended such as a metal foil, a resin sheet, or a non-woven sheet, or may also be a member keeping a constant shape such as a metal plate or a resin molded component. When the base member 12 is a sheet-like member flexibly bended, the base member 12 to which the electrical wire group 20 is fixed may be arranged as a flat wiring member along an arrangement target position in a vehicle. When the base member 12 is a member keeping a constant shape, the base member 12 is assumed to be a constituent component of a vehicle such as a metal body, a reinforcement made of metal, and various resin panels (such as a door panel) in a vehicle, for example. In this case, the electrical wire arrangement structure 10 of the electrical wire is a vehicle constituent component with an electrical wire. When the base member 12 is a member keeping a constant shape, the base member 12 is also assumed to be a resin molded component formed along a main surface shape of a constituent member of a vehicle. In this case, the electrical wire arrangement structure 10 of the electrical wire is a wiring member in which a route is regulated.

Herein, the base member 12 is assumed to be a metal plate member. Metal is assumed to be iron, stainless, aluminum, and various kinds of metal alloy. In the description herein, the base member 12 is a steel plate. The base member 12 is formed into a quadrangular shape, for example. The base member 12 is thick enough to be able to keep a constant shape (a flat shape herein). One main surface of the base member 12 functions as the fixation surface 13 to which the electrical wire group 20 is fixed.

The electrical wire group 20 includes four or more electrical wires 22. Accordingly, three or more portions between the electrical wires 22 can be provided between the four or more electrical wires 22. The electrical wire group 20 may include five or more electrical wires, six or more electrical wires, eight or more electrical wires, or ten or more electrical wires.

The electrical wire 22 is a wire-like member transmitting an electrical power. Herein, the electrical wire 22 includes a core wire 23 and a covering 24 (only some of the electrical wires 22 are illustrated). The core wire 23 is a wire-like member formed of metal such as copper, copper alloy, aluminum, or aluminum alloy. The core wire 23 may be made up of one metal wire or a collection of a plurality of strands. The covering 24 is an insulating material covering around the core wire 23. The covering 24 is formed by extrusion-coating melted resin around the core wire 23, for example. The electrical wire may be a shielded wire or an enamel wire. The electrical wire may transmit a signal or an electrical power. The four or more electrical wires may have the same outer diameter or an outer diameter different from each other, and a core wire diameter in the four or more electrical wires may have the same diameter or an outer diameter different from each other. A cross-sectional area of the core wire is normally set in accordance with a current value of a signal or an electrical power to be transmitted.

At least a part of the electrical wire group 20 is fixed on the fixation surface 13 in the base member 12. The electrical wire 22 may be fixed to the fixation surface 13 by an adhesive agent. When metal is exposed in the fixation surface 13 of the base member 12, an adhesive agent appropriate for bonding to resin exposed in a surface of the covering 24 and metal in the fixation surface 13. For example, it is also applicable that the adhesive agent contains a chemical compound including a resin side functional group and a metal side functional group in a molecular structure, the resin side functional group is chemically bonded to the resin constituting the covering 24 and the metal side functional group is chemically bonded to the metal exposed in the fixation surface 13 as with an adhesive agent including a silane coupling agent. For example, it is also applicable that the metal side functional group is an alkoxy group, and the chemical compound further include silicon bonding the alkoxy group and the resin side functional group in a molecular structure. The metal side functional group may be a chelate group. When the resin constituting the covering 24 is polyvinyl chloride, the resin side functional group may be one type or two or more types of functional group selected from a group made up of an amino group, a thiol group, and an epoxy group. When the resin constituting the covering 24 is polyolefin, the resin side functional group may be one type or two or more types of functional group selected from a group made up of an amino group, a thiol group, a vinyl group, an acrylic group, a methacryl group, and an epoxy group. The chemical compound may be a polymer in which the plurality of resin side functional groups and the plurality of inorganic material side functional groups are bonded to a molecular chain.

When resin is exposed in the fixation surface 13 of the base member 12, a general adhesive agent appropriate for bonding resin to resin may be used. The covering 24 and the fixation surface 13 may be welded by ultrasonic welding or thermal welding by applying heat, for example.

A configuration of fixing the electrical wire 22 to the fixation surface 13 is not limited to the above examples. For example, also applicable is a configuration of sewing the electrical wire 22 to the base member 12 with a sewing thread. Also applicable is a configuration that an adhesive tape or an adhesive sheet adheres to the electrical wire 22 and the fixation surface 13, thereby pressing the electrical wire 22 against the fixation surface 13. Also applicable is a configuration that a plurality of grooves or plural groups of protrusions in which the electrical wire 22 is fitted are formed in the fixation surface 13, and the electrical wire 22 is sandwiched between the grooves or a pair of protrusions.

In any configuration, at least some of the electrical wire group 20 is fixed on the fixation surface 13 in the base member 12. However, it is not necessary for the base member 12 to include the fixation surface 13. The plurality of electrical wires 22 may be embedded inside of resin, for example, to be kept in a parallel state.

The electrical wire group 20 includes a parallel arrangement part 26 fixed in a parallel state in the fixation surface 13. FIG. 1 illustrates an arrangement relationship in the parallel arrangement part 26. The plurality of electrical wires 22 are fixed on the fixation surface 13 in a parallel state. In the parallel arrangement part 26, a direction in which the plurality of electrical wires 22 are arranged, that is to say, a direction perpendicular to both the fixation surface 13 and the electrical wire 22 is referred to as a width direction. In the parallel arrangement part 26, an average value of sizes between the electrical wires 22 in a central part region in the width direction is larger than an average value of sizes between the electrical wires 22 in both side part regions in the width direction.

The side part region in the width direction is a region including the electrical wire 22 on a leftmost end portion or a rightmost end portion. The central part region in the width direction is a region including the electrical wire 22 located in a centermost position in the width direction. The central part region may contact with the side part region. The other region may intervene between the central part region and the side part region. When the central part region and the side part region have contact with each other, a boundary therebetween can be determined by a size standard or a number standard, for example. In all the settings of the central part region and the side part region, the average value of the sizes between the electrical wires 22 in the central part region needs not be larger than the average value of the sizes between the electrical wires 22 in the both side part regions. That is to say, it is sufficient that in the setting of one of the central part region and the side part region, the average value of the sizes between the electrical wires 22 in the central part region is larger than the average value of the sizes between the electrical wires 22 in the both side part regions.

Described is an example of setting the central part region and the side part region by the size standard. For example, it is applicable that when the parallel arrangement part 26 is equally divided into three by a length in a parallel direction, outer side regions on both sides thereof are both side part regions R2 and R2 and a central region is a central part region R1.

A configuration is described more specifically based on the example illustrated in FIG. 1. FIG. 1 exemplifies twenty-three electrical wires 22. A total number of the electrical wires 22 is an odd number. When the electrical wires 22 are symmetrically arranged in a right-left direction, the twelfth electrical wire 22 when counted from the right and the left is located in the central part. Sizes between the electrical wires 22 is set to d1, d2, d3, d4, 0 (having contact), 0, d5, 0, 0, 0, and 0 from the electrical wire 22 in the center toward the electrical wire 22 on the outer side in the parallel direction. Herein, $d1>d2>d3>d4=d5$ is satisfied.

A width of the electrical wire group 20 in the parallel arrangement part 26 is equally divided into three by a length standard. The tenth electrical wire 22 when counted from an end in the parallel direction is located on the boundary. Thus, the central part region R1 includes portions between the five electrical wires 22 close to the center. An average value of sizes between these electrical wires 22 is $(d1\times2+d2\times2)/4$. Each of the side part regions R2 and R2 includes portions between the first to tenth electrical wires 22 when counted from a side part. An average value of sizes between the electrical wires 22 in the side part region R2 is $(d3+d4+d5)/9$. This average value is the same as the average value of the sizes between the electrical wires 22 in the whole side part regions R2 and R2.

In the example illustrated in FIG. 1, d1 is 1.0 mm, d2 is 0.7 mm, d3 is 0.4 mm, and d4=d5 is 0.1 mm (referred to as an arrangement pattern 1). In this case, a total sum of the gaps is 4.6 mm, and a width thereof is larger by 4.6 mm than a case where the plurality of electrical wires 22 are closely arranged in parallel. In this case, an average value of the sizes between the electrical wires 22 in the central part region R1 is 0.85 mm. An average value of the sizes between the electrical wires 22 in the side part region R2 is 0.067 mm. Thus, the former average value is larger than the latter average value.

When the portion between the electrical wires 22 is located on the boundary of the regions equally divided into three, it may be considered that the portion between the electrical wires 22 belongs to the central part region R1 or the side part region R2, or does not belong to any of the central part region R1 and the side part region R2.

Described is an example of setting the central part region and the side part region by the number standard. For example, it is applicable that both side part regions S2 and S2 corresponding to the both side part regions R2 and R2 are region where the electrical wires 22 being one-third or less of a total number of the electrical wires 22 in the parallel arrangement part 26 are arranged when the total number is counted from both sides of the parallel arrangement part 26, and a central part region S1 corresponding to the central part region R1 is a region where remaining electrical wires 22 are arranged.

A configuration is described more specifically based on the example illustrated in FIG. 1 in the manner similar to the above description. The total number of the electrical wires 22 in the parallel arrangement part 26 is twenty three, thus one-third of this value is 7.67 (the number of the electrical wires 22). Thus, one-third or less of the total number of the electrical wires 22 is seven. Thus, the first to seventh electrical wires 22 when counted from the side part are arranged in each of the side part regions S2 and S2. The central part region S1 is a region where the remaining electrical wires 22, that is to say, nine electrical wires 22 close to the center are arranged.

An average value of sizes between these electrical wires 22 in the central part region S1 is $(d1\times2+d2\times2+d3\times2+d4\times$ 2)/8. An average value of sizes between the electrical wires 22 in the side part regions S2 and S2 is d5/6. This average value is the same as the average value of the sizes between the electrical wires 22 in the whole side part regions S2 and S2.

In the example illustrated in FIG. 1, when the size between each electrical wire 22 is considered to be the same as the example described above, the average value of the sizes between the electrical wires 22 in the central part region S1 is 0.55 mm. An average value of the sizes between the electrical wires 22 in the side part region S2 is approximately 0.017 mm. Thus, the former average value is larger than the latter average value.

In a case where the total number of the electrical wires 22 is equally divided into three, it may be considered that the portion between the electrical wires 22 located between the electrical wires 22 belonging to the adjacent regions S1 and S2 belongs to the central part region S1 or the side part region S2, or does not belong to any of the central part region S1 and the side part region S2. The above example is an example based on a third plan.

It is applicable that when three or more gaps for heat radiation are formed between four or more electrical wires 22 in the parallel arrangement part 26, a size of the three or more gaps for heat radiation is reduced from a center toward an outer side in a width direction. In the example illustrated in FIG. 1, the sizes between the electrical wires 22 are set to d1, d2, d3, d4, 0 (having contact), 0, d5, 0, 0, 0, and 0 from the electrical wire 22 in the center toward the electrical wire 22 on the outer side in the parallel direction. Portions whose sizes between the electrical wires 22 becomes d1, d2, d3, d4, and d5, respectively, are portions where the gap for heat radiation is formed. Since d1>d2>d3>d4=d5 is satisfied, sizes of three or more gaps for heat radiation are reduced from the center toward the outer side in the width direction. Herein, a case where the sizes of three or more gaps for heat radiation are reduced from the center toward the outer side in the width direction includes a case where the gaps having the same size are partially formed continuously. In other words, it is sufficient that the sizes of three or more gaps for heat radiation are reduced by at least one step from the center toward the outer side in the width direction.

The gap for heat radiation may be considered a portion between the plurality of electrical wires 22 except for a portion where the plurality of electrical wires 22 have contact with each other. However, there may also be a case where a gap also occurs in a portion between the electrical wires 22 where the gap for heat radiation is not formed due to an error or a limitation in manufacture in accordance with a design.

According to the present embodiment, in the parallel arrangement part 26, the average value of the sizes between the electrical wires 22 in the central part region R1 (or S2) is larger than the average value of the sizes between the electrical wires 22 in the both side part regions R2 (or S2). Herein, the plurality of electrical wires 22 are parallelly arranged in the parallel arrangement part 26, thus heat is radiated more efficiently in the both side parts in the width direction than in the central part in the width direction. Thus, when the average value of the sizes between the electrical wires 22 is increased in the central part region R1 (or S1), the electrical wires 22 are coarsely arranged, and the efficient heat radiation is expected. Even when the average value of the sizes between the electrical wires 22 is reduced in the side part region R2 (or S2), the electrical wires 22 in the side part region R2 (or S2) tends to be exposed to relatively cool air, thus the efficient heat radiation is expected. When the average value of the sizes between the electrical wires 22 is reduced in the side part region R2 (or S2), the width of the parallel arrangement part 26 can be reduced, and an arrangement layout can be reduced. As a result, heat radiation properties are improved by a configuration as compact as possible.

The central part region R1 and the both side part regions R2 and R2 are dividedly considered by the length standard in the parallel direction described above, thus the heat is efficiently radiated in the central part region R1, and the electrical wires 22 are arranged as close as possible in the both side part regions R2 and R2.

The central part region S1 and the both side part regions S2 and S2 are dividedly considered by the number standard in the parallel direction described above, thus the heat is efficiently radiated in the central part region S1, and the both side part regions S2 and S2 are formed as narrowly as possible.

The sizes d1, d2, d3, d4, and d5 of three or more gaps for heat radiation are reduced from the center to the outer side in the width direction of the parallel arrangement part 26. Thus, the electrical wires 22 are coarsely arranged with a decreasing distance from the center where heat is easily accumulated. As a result, heat radiation itself is reduced, and in addition, heat is efficiently radiated. The electrical wires 22 are closely arranged with a decreasing distance from the side edge part where heat is easily radiated, and an arrangement space is reduced. Thus, achieved is a configuration effective for improving the heat radiation properties by a configuration as compact as possible.

Application examples and modification examples are described based on a premise of the embodiments described above.

Figure 2:
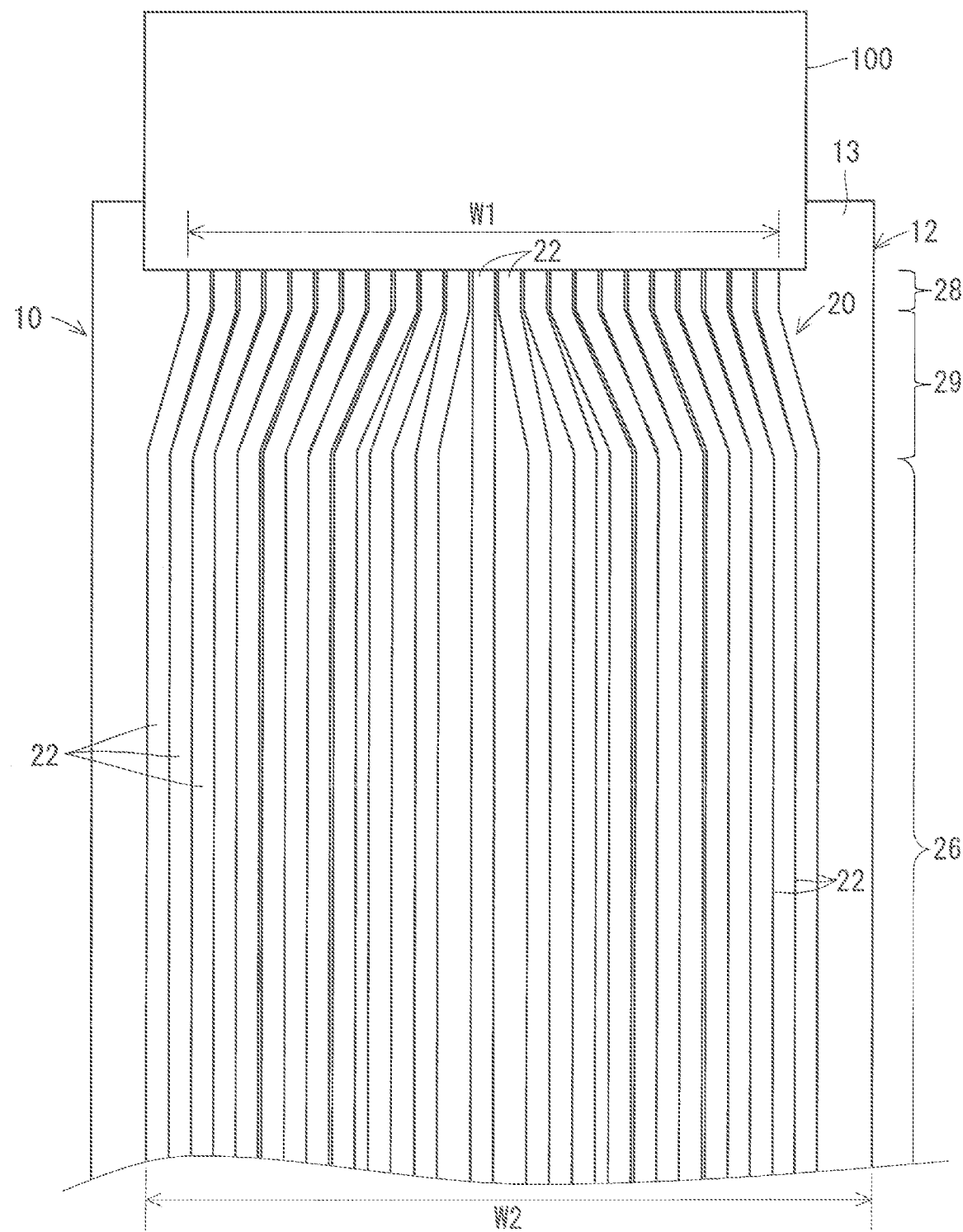
FIG. 2 is a drawing illustrating an example that a connector is provided on an end portion of the electrical wire arrangement structure.

FIG. 2 is a drawing illustrating an example that a connector 100 is provided on an end portion of the electrical wire arrangement structure 10.

The connector 100 is provided on the end portion of the base member 12. Herein, the connector 100 is fixed to the end portion of the base member 12. Fixation may be achieved by an adhesive agent, welding, a fitting structure, or a screwing, for example. The connector 100 needs not be fixed to the end portion of the base member 12.

A terminal is attached to end portions of the plurality of electrical wires 22. A plurality of cavities are formed in a parallel state in the connector 100. The plurality of terminals are inserted into the plurality of cavities in the connector 100. That is to say, the end portion of the electrical wire group 20 is connected to the connector 100 in a parallel state. A part 28 of the electrical wire group 20 extending out of the connector 100 has a width corresponding to a width of the plurality of cavities in the connector 100. That is to say, when the terminal is inserted into the cavity, the electrical wire 22 to which the terminal is connected extends straight to a back surface side of the connector 100. Thus, a pitch of the plurality of electrical wires 22 coincides with a pitch of the plurality of cavities in the connector 100. A width W1 of the part 28 of the electrical wire group 20 extending out of the connector 100 is determined in accordance with this pitch.

The electrical wire group 20 reaches the parallel arrangement part 26 from the part 28 described above via a transition part 29. In the transition part 29, the electrical wire group 20 is arranged on the fixation surface 13 to extend to the outer side in the parallel direction. With regard to a width W2 in the parallel arrangement part 26, the width of the electrical wire group 20 is increased by the gap for heat radiation.

In this manner, the width W2 in the parallel arrangement part 26 is increased regardless of the width of the connector 100, thus the heat radiation properties in the parallel arrangement part 26 of the electrical wire group 20 is improved.

There may also be a case where the width W2 in the parallel arrangement part 26 is larger than the width of the part 28 of the electrical wire group 20 extending out of the connector 100 depending on a pitch of the cavity in the connector 100, for example.

Figure 3:
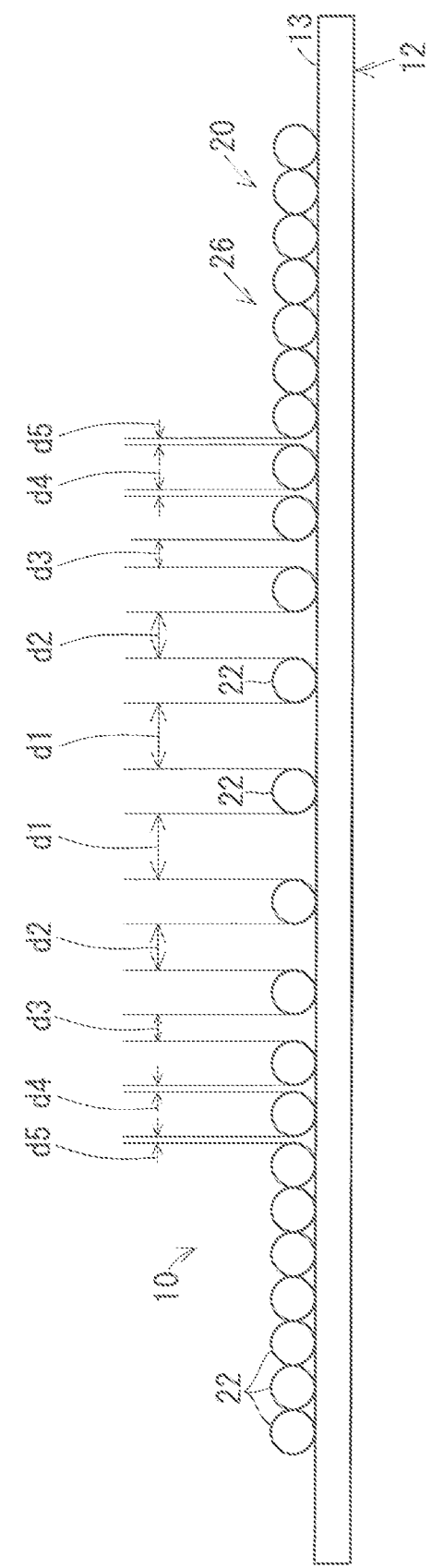
FIG. 3 is a drawing illustrating another example of an arrangement of an electrical wire group on a base member.
Figure 4:
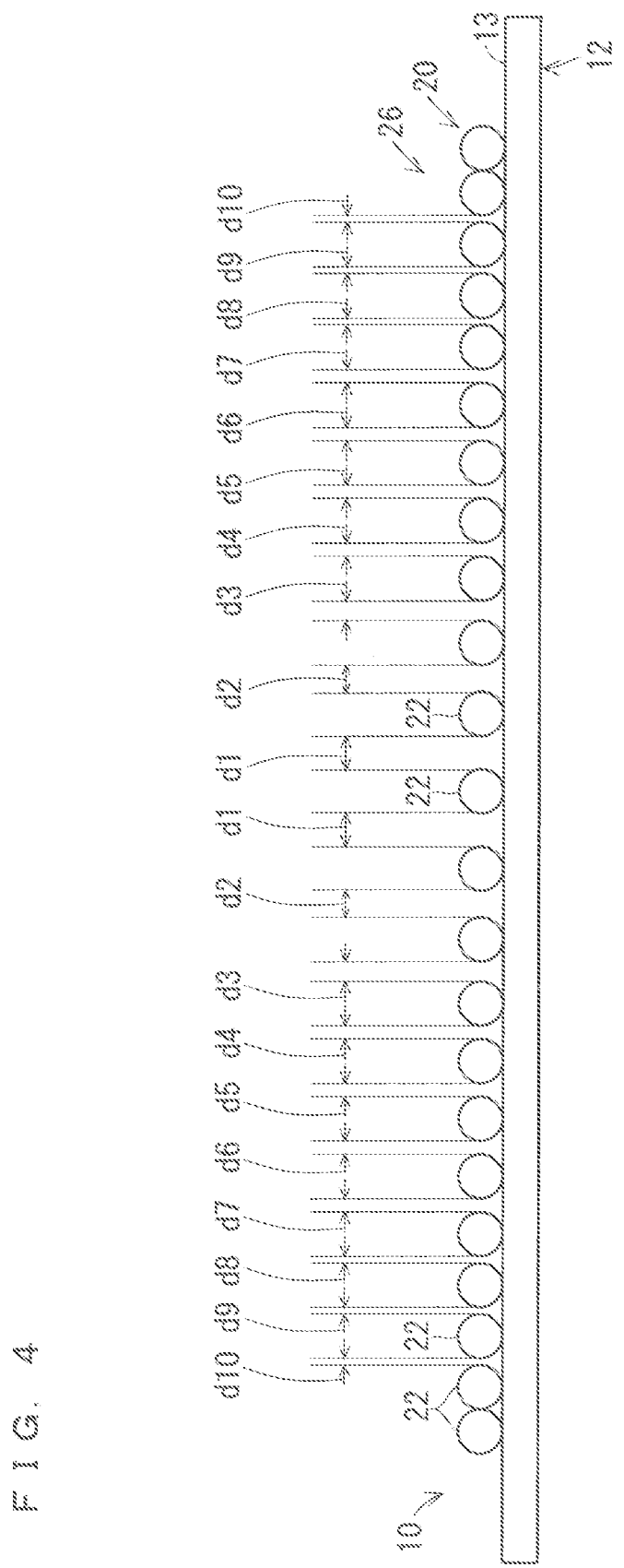
FIG. 4 is a drawing illustrating still another example of the arrangement of the electrical wire group on the base member.

FIG. 3 and FIG. 4 are drawings each illustrating another example of the arrangement of the electrical wire group 20 on the base member 12. The examples illustrated in FIG. 3 and FIG. 4 are different from that in FIG. 1 in the size between the electrical wires 22.

In the example illustrated in FIG. 3, the sizes between the electrical wires 22 are set to d1, d2, d3, d4, d5, 0 (having contact), 0, 0, 0, 0, and 0 from the electrical wire 22 in the center toward the electrical wire 22 on the outer side in the parallel direction. The sizes are set so that a relationship of d1>d2>d3>d4=d5 is established. For example, d1 is set to 1.0 mm, d2 is set to 0.7 mm d3 is set to 0.4 mm, and d4=d5 is set to 0.1 mm (referred to as an arrangement pattern 2). A total sum of the gaps in this case is 4.6 mm, and is the same as the total sum of the gaps in the example of the gap sizes in FIG. 1.

The example illustrated in FIG. 3 is an example that the average value of the sizes between the electrical wires 22 in the central part region is larger than the average value of the sizes between the electrical wires 22 in the both side part regions by the size standard and the number standard as described in the embodiment. The example illustrated in FIG. 3 is one of the examples that the sizes d1, d2, d3, d4, and d5 of three or more gaps for heat radiation are reduced from the center to the outer side in the width direction.

In the example illustrated in FIG. 4, the sizes between the electrical wires 22 are set to d1, d2, d3, d4, d5, d6, d7, d8, d9, d10, and 0 (having contact) from the electrical wire 22 in the center toward the electrical wire 22 on the outer side in the parallel direction. Herein, the sizes are set so that a relationship of d1>d2>d3>d4=d5=d6=d7>d8=d9=d10 is established. For example, d1 is set to 0.5 mm, d2 is set to 0.4 mm, d3 is set to 0.3 mm, d4=d5=d6=d7 is set to 0.2 mm, and d8=d9=d10 is set to 0.1 mm (referred to as an arrangement pattern 3). A total sum of the gaps in this case is 4.6 mm, and is the same as the total sum of the gaps in the example of the gap sizes in FIG. 1.

Also the example illustrated in FIG. 4 is an example that the average value of the sizes between the electrical wires 22 in the central part region is larger than the average value of the sizes between the electrical wires 22 in the both side part regions by the size standard and the number standard as described in the embodiment. The example illustrated in FIG. 4 is one of the examples that the sizes d1, d2, d3, d4, d5, d6, d7, d8, and d9 of three or more gaps for heat radiation are reduced from the center to the outer side in the width direction.

Experimentation Example

A time for a temperature of the electrical wire to reach 150° C. is calculated by a computer aided engineering (CAE) analysis in a case where an electrical power is flowed in the electrical wire 22.

Figure 5:
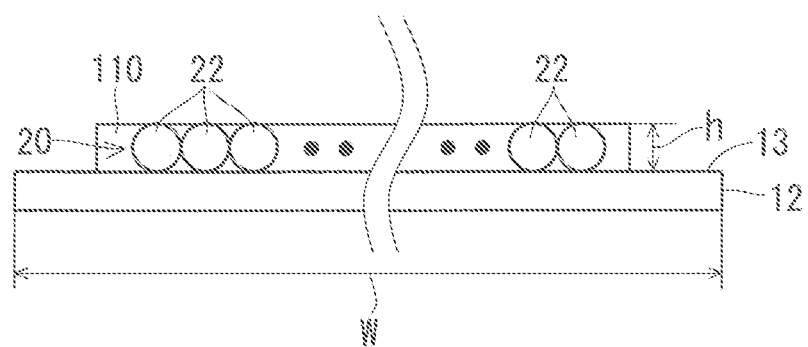
FIG. 5 is a diagram illustrating an example of a model of the electrical wire arrangement structure.

Analysis conditions are as follows. Assumed as a model is a configuration that twenty-three electrical wires 22 are fixed on the base member 12 as illustrated in FIG. 5. In this model, the electrical wires 22 are fixed by an adhesive agent 110. The base member 12 is a steel plate having a width (W) of 60 mm and a thickness of 1.6 mm. A radiation ratio of the adhesive agent is 0.8. Assumed as thermal conductivity of the adhesive agent are four cases of 1 W/m·K, 2 W/m·K, 3 W/m·K, and 4 W/m K. Assumed as a height h of the adhesive agent 110 are three cases where the height h is a quarter of a height (diameter) of the electrical wire 22, a half of that of the electrical wire 22, and the same as that of the electrical wire 22 (that is to say, the electrical wire 22 is wholly embedded). The electrical wires 22 are thin-insulation low-voltage wires for automobiles (AVSS) of 0.5 sq (square mm).

Then, a time for a temperature of each electrical wire 22 to reach 150° C. is analyzed based on a setting that current of 25 A flows in each electrical wire 22.

Adopted as the arrangement of the electrical wire 22 is a model in which the twenty-three electrical wires 22 are closely and parallelly arranged as an example 1 for comparison. Adopted is a model in which the twenty-three electrical wires 22 are parallelly arranged at uniform intervals of 0.209 mm in size as an example 2 for comparison.

Figure 6:
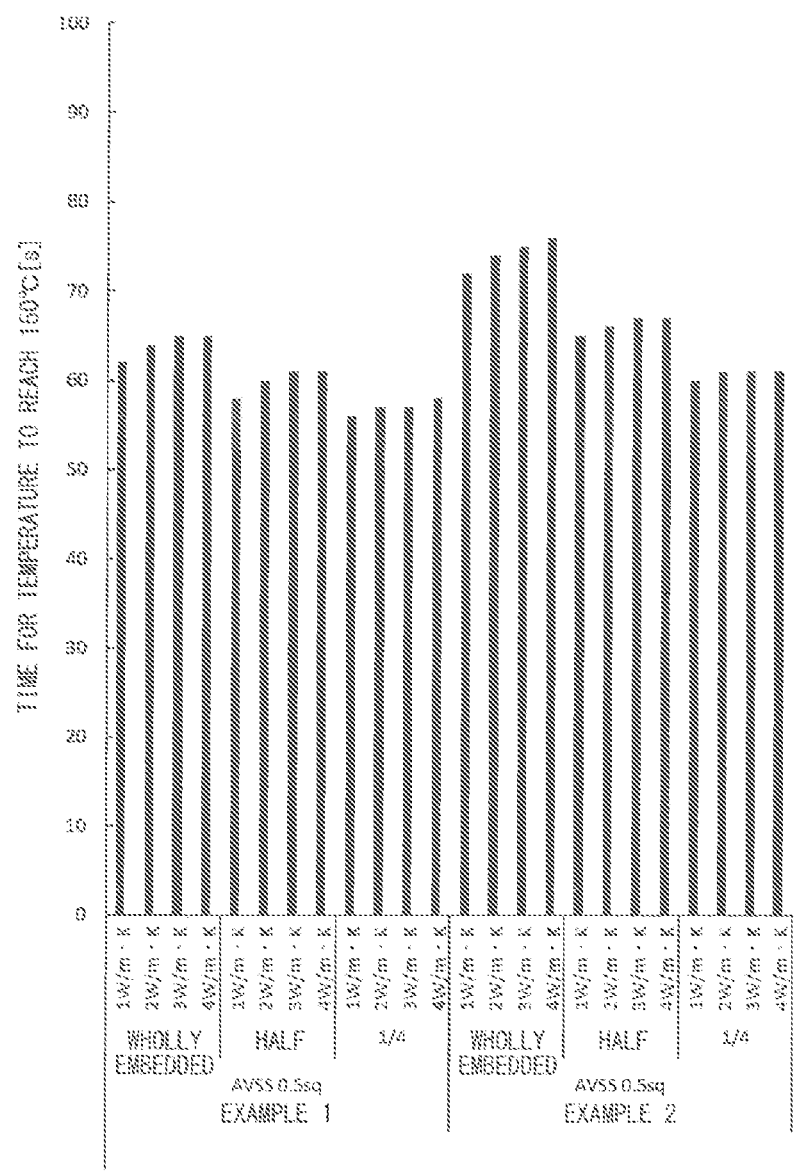
FIG. 6 is a drawing illustrating an analysis result of a time for a temperature of the electrical wire to reach 150° C. for an example 1 and an example 2.

FIG. 6 illustrates an analysis result of a time for a temperature of the electrical wire 22 to reach 150° C. for the example 1 and the example 2. FIG. 7 illustrates an analysis result of a time for a temperature of the electrical wire 22 to reach 150° C. for the arrangement patterns 1, 2, and 3 described above. FIG. 6 and FIG. 7 illustrate a smallest value of the time for the temperature of the plurality of electrical wires 22 to reach 150° C. in each example or arrangement pattern.

As illustrated in FIG. 6, it is recognized that the time for the temperature to reach 150° C. gradually increases as thermal conductivity of the adhesive agent gets larger in each of the example 1 and the example 2. It is recognized that the time for the temperature to reach 150° C. increases as the height of the adhesive agent 110 gets larger. It is recognized that the time for the temperature to reach 150° C. increases more in the example 2 than in the example 1, that is to say, in the case where the gap is provided between the electrical wires 22.

FIG. 7 illustrates analysis results of each of the arrangement patterns 1, 2, and 3 described above. According to the comparison results of FIG. 6 and FIG. 7, it is recognized that the time for the temperature to reach 150° C. increases by the arrangement patterns according to the embodiment described above and the modification example thereof.

Particularly, the time for the temperature to reach 150° C. is longer in the arrangement patterns 1, 2, and 3 than in the example 2 even though the whole width of the plurality of electrical wires 22 in the arrangement patterns 1, 2, and 3 is the same as that in the example 2. Thus, it is recognized that heat is effectively radiated in a limited arrangement space by the arrangement patterns 1, 2, and 3.

It is recognized that the time for the temperature to reach 150° C. is longer in particularly the arrangement patterns 1 and 2 than in the arrangement pattern 3 and the example 2, thus increase in the difference in the gap between the central part region and the both side part regions is effective to increase the time for the temperature to reach 150° C.

It is recognized that in the arrangement patterns 1, 2, and 3, the difference in the thermal conductivity of the adhesive agent does not have a large influence on the time for the temperature to reach 150° C. It is recognized that in the arrangement patterns 1 and 2, the difference in the thermal conductivity of the adhesive agent hardly has an influence on the time for the temperature to reach 150° C. The reason thereof is considered that the size of the gap in the central part region is set to large and the size of the gap in the both side part region is set to small, thus heat is diffused to some degree, and significance of thermal conductivity caused by the adhesive agent 110 is lessened. Thus, it is recognized that the heat radiation properties of the electrical wire arrangement structure 10 is improved even though an adhesive agent excellent in thermal conductivity is not used.

Moreover, it is recognized that the time for the temperature to reach 150° C. increases as the height of the adhesive agent 110 gets larger also in FIG. 7 in the manner similar to FIG. 6.

Even when a current value is changed to 20 A and 15 A and CAE analysis is performed, the similar tendency is shown.

EXPLANATION OF REFERENCE SIGNS 10 arrangement structure
12 base member
13 fixation surface
20 electrical wire group
22 electrical wire
23 core wire
24 covering
26 parallel arrangement part
28 part extending out of connector
29 transition part
100 connector
110 adhesive agent
R1 central part region
R2 side part region
S1 central part region
S2 side part region
d1, d2, d3, d4, d5, d6, d7, dg, and d9 size
h height

The invention claimed is:

1. An electrical wire arrangement structure, comprising:
a base member; and
an electrical wire group including four or more electrical wires, wherein
the electrical wire group includes a parallel arrangement part fixed in a parallel state by the base member,
in the parallel arrangement part, the base member is continuously formed in a direction in which the four or more electrical wires are arranged, and
furthermore, in the parallel arrangement part, an average value of sizes between the electrical wires in a central part region in a width direction is larger than an average value of sizes between the electrical wires in both side part regions in a width direction, wherein
the both side part regions are regions where the electrical wires being one-third or less of a total number of the electrical wires in the parallel arrangement part are arranged when the total number is counted from both sides of the parallel arrangement part, and the central part region is a region where remaining electrical wires are arranged.

2. The electrical wire arrangement structure according to claim 1, wherein
when the parallel arrangement part is equally divided into three by a length in a parallel direction, both outer side regions in the parallel arrangement part is the both side part regions and a central region is the central part region.

3. An electrical wire arrangement structure, comprising:
a base member; and
an electrical wire group including four or more electrical wires, wherein
the electrical wire group includes a parallel arrangement part fixed in a parallel state by the base member,
in the parallel arrangement part, the base member is continuously formed in a direction in which the four or more electrical wires are arranged, and
furthermore, in the parallel arrangement part, an average value of sizes between the electrical wires in a central part region in a width direction is larger than an average value of sizes between the electrical wires in both side part regions in a width direction,
wherein
an end portion of the electrical wire group is connected to a connector in a parallel state, and
a width of the parallel arrangement part is larger than a width of the electrical wire group extending out of the connector.

4. An electrical wire arrangement structure, comprising:
a base member; and
an electrical wire group including four or more electrical wires, wherein
the electrical wire group includes a parallel arrangement part fixed in a parallel state by the base member,
in the parallel arrangement part, the base member is continuously formed in a direction in which the four or more electrical wires are arranged, and
furthermore, in the parallel arrangement part, an average value of sizes between the electrical wires in a central part region in a width direction is larger than an average value of sizes between the electrical wires in both side part regions in a width direction,
wherein
three or more gaps for heat radiation are formed between the four or more electrical wires in the parallel arrangement part, and
a size of the three or more gaps for heat radiation is reduced from a center toward an outer side in a width direction.

* * * * *